United States Patent
Kieswetter et al.

(10) Patent No.: US 9,463,511 B2
(45) Date of Patent: Oct. 11, 2016

(54) INSPIRATOR FOR A GAS HEATER

(71) Applicant: Heat Design Equipment Inc., Kitchener (CA)

(72) Inventors: Robert E. Kieswetter, Wellesley (CA); Jeffrey Girodat, Kitchener (CA)

(73) Assignee: HEAT DESIGN EQUIPMENT INC., Kitchener, Ontario (CA)

( * ) Notice: Subject to any disclaimer, the term of this patent is extended or adjusted under 35 U.S.C. 154(b) by 0 days.

(21) Appl. No.: 14/143,314

(22) Filed: Dec. 30, 2013

(65) Prior Publication Data

US 2014/0232019 A1   Aug. 21, 2014

Related U.S. Application Data

(60) Provisional application No. 61/747,077, filed on Dec. 28, 2012.

(51) Int. Cl.
  *B23B 1/00*  (2006.01)
  *F23D 14/64*  (2006.01)

(52) U.S. Cl.
  CPC .............. *B23B 1/00* (2013.01); *F23D 14/64* (2013.01); *Y10T 82/10* (2015.01)

(58) Field of Classification Search
  CPC ............ F23D 14/04; F23D 2900/14241; F23D 11/402; F23D 14/10; F23D 14/64; F23D 14/46; B23B 1/00; Y10T 82/10
  See application file for complete search history.

(56) References Cited

U.S. PATENT DOCUMENTS

| | | | | |
|---|---|---|---|---|
| 1,932,321 A * | 10/1933 | Moseley | ............. | F23D 14/04 431/349 |
| 1,968,620 A * | 7/1934 | Roth | ............. | F23D 14/04 29/890.02 |
| 3,259,170 A * | 7/1966 | Koehrer | ............. | F23D 14/04 239/416.5 |
| 3,498,545 A * | 3/1970 | Short | ............. | F23D 14/04 239/417.5 |
| 3,726,634 A * | 4/1973 | Thomson | ............. | F23D 14/32 239/403 |
| 3,915,623 A * | 10/1975 | Wormser | ............. | F23D 14/04 239/399 |
| 4,067,686 A * | 1/1978 | Karpisek | ............. | F23D 14/04 431/353 |
| 4,460,533 A * | 7/1984 | Cox | ............. | B29C 33/046 165/126 |
| 4,565,560 A * | 1/1986 | Krumwiede | ............. | C03B 5/235 432/160 |

(Continued)

FOREIGN PATENT DOCUMENTS

| | | | | |
|---|---|---|---|---|
| CA | 2800354 A1 * | 6/2014 | ............. | B01F 5/0428 |
| CH | EP 2821130 A2 * | 1/2015 | ............. | B01F 5/0428 |

(Continued)

*Primary Examiner* — Amber R Orlando
*Assistant Examiner* — Stephen Hobson
(74) *Attorney, Agent, or Firm* — Daryl W. Schnurr

(57) ABSTRACT

An inspirator for use with an infrared heater and method of manufacturing a venturi body of the inspirator is described. The inspirator is formed from a solid piece of metal and has an elongated bore having en inlet and an outlet. The inlet smoothly tapers to a venturi with a successively step bore downstream of the venturi to the outlet. The inspirator has a fuel inlet and an air inlet to the venturi.

17 Claims, 4 Drawing Sheets

(56) References Cited

U.S. PATENT DOCUMENTS

| | | | | |
|---|---|---|---|---|
| RE32,133 E | * | 5/1986 | Koziol | F23D 14/04 126/25 R |
| 4,744,748 A | * | 5/1988 | Raines | F23D 14/74 239/552 |
| 4,997,459 A | * | 3/1991 | Pelkey | F17D 1/20 137/115.23 |
| 5,893,641 A | * | 4/1999 | Garcia | B01F 5/0413 137/888 |
| 6,623,154 B1 | * | 9/2003 | Garcia | B01F 5/0415 137/888 |
| 7,614,614 B2 | * | 11/2009 | Sabadicci | B01F 5/0413 261/76 |
| 2005/0250062 A1 | * | 11/2005 | Kornbluth | F23C 7/004 431/79 |
| 2009/0286190 A1 | * | 11/2009 | Browning | F23D 14/04 431/9 |
| 2011/0042835 A1 | * | 2/2011 | Sabadicci et al. | 261/76 |
| 2016/0131361 A1 | * | 5/2016 | Skachkov | F23D 14/20 431/5 |

FOREIGN PATENT DOCUMENTS

| | | | |
|---|---|---|---|
| EP | 2821130 A2 | * | 1/2015 |
| FR | 2313706 A1 | * | 12/1976 ........ B01F 3/04049 |

* cited by examiner

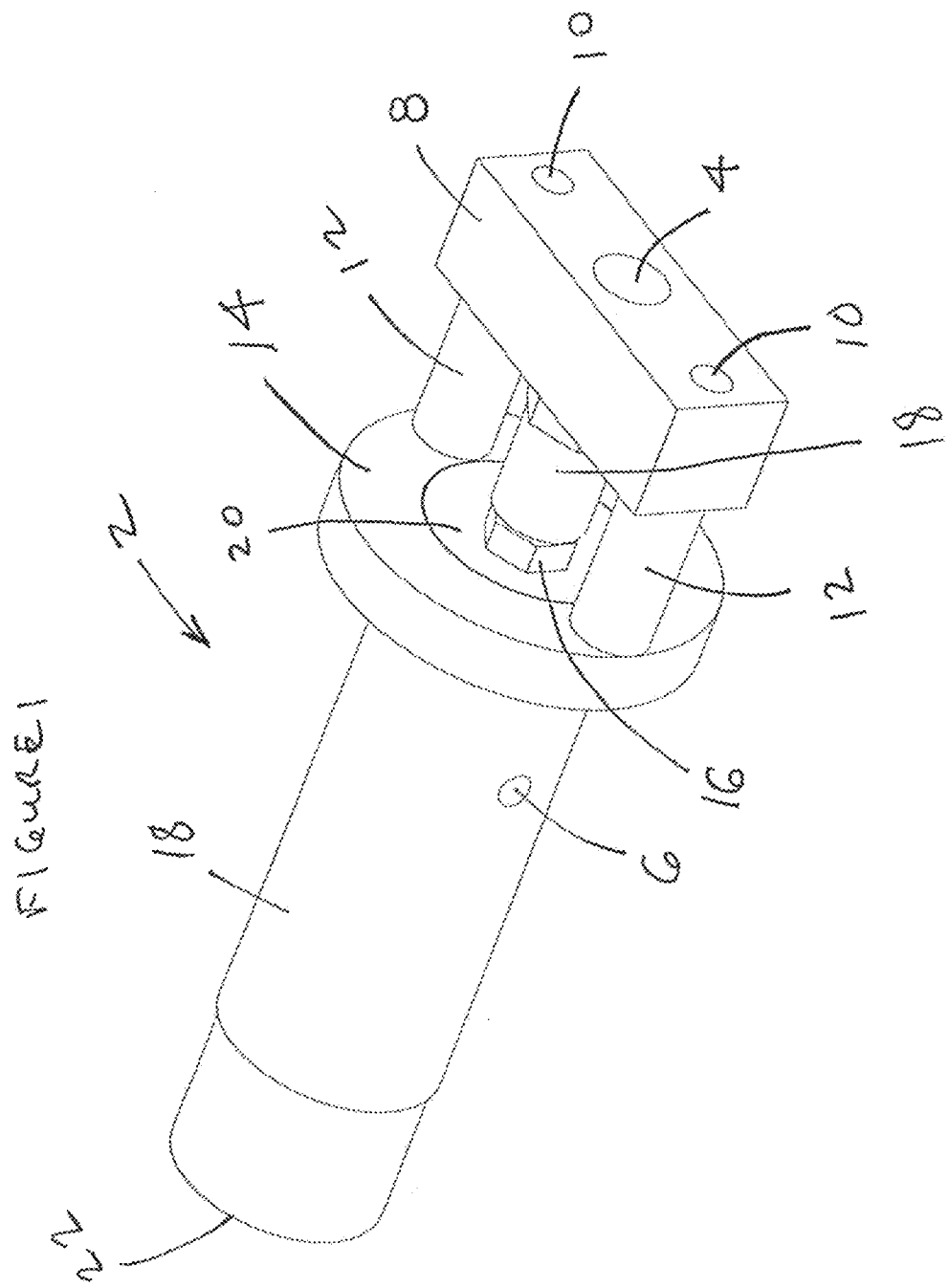

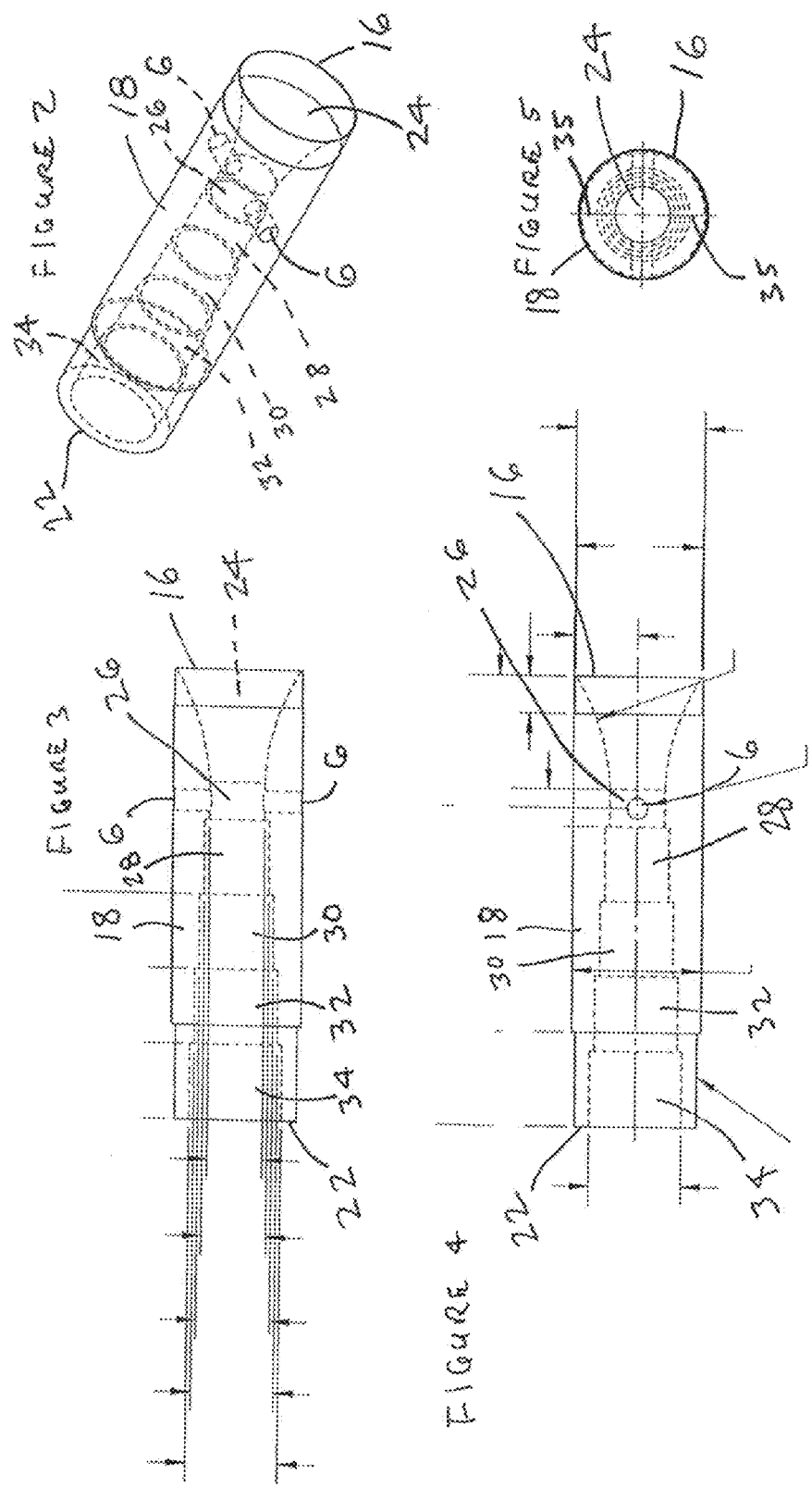

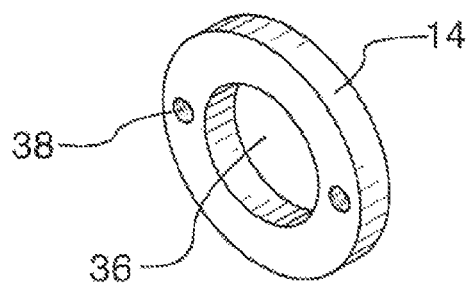
Figure 6
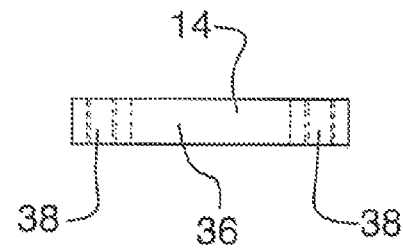
Figure 7
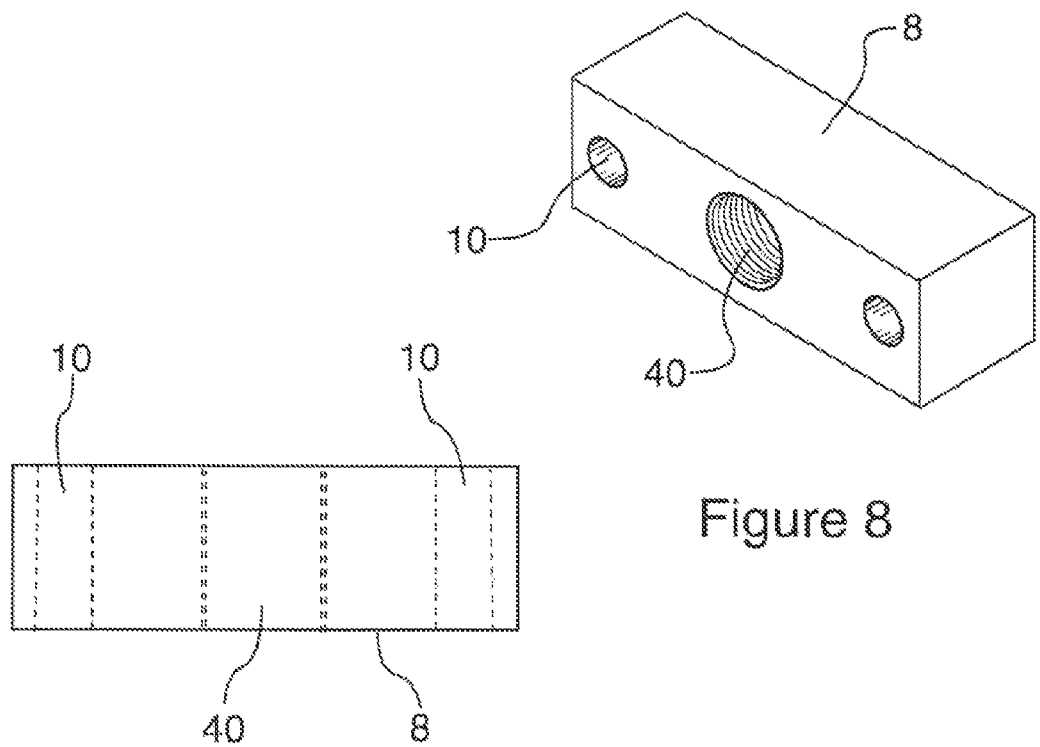
Figure 8
Figure 9

US 9,463,511 B2

INSPIRATOR FOR A GAS HEATER

This application Claims the benefit of U.S. Provisional Application No. 61/747,077 filed Dec. 28, 2012

BACKGROUND OF THE INVENTION

1. Field of the Invention

This invention relates to an inspirator for a burner of an infrared heater, the inspirator having a bore with a plurality of successively larger steps downstream of a venturi.

2. Description of the Prior Art

Inspirators for burners and heaters are known and have a fuel inlet and air inlet in a bore that narrows to a venturi and smoothly expands downstream of the venturi to achieve a combustible fuel air mixture. Inspirators are often cast from metal or made from ceramics. Previous inspirators are fragile and are easily damaged and are usually used to power a burner, heater or furnace in which an open flame is created. Inspirators are expensive. Cast metal is much more brittle than the uncast metal. Cast metal of the venturi body and ceramic venturi bodies are subject to premature failure if they are not handled with extreme care as they can easily break or crack. When a venturi body breaks or cracks, the heater must be shut down for repair. The down time can be extremely inconvenient and expensive. The conditions under which a heater is used often involve sudden movement, changes in direction and slamming the heater against a supporting surface, all of which can cause the inspirator or venturi body to break or crack. A gas fired radiant heating unit is described in U.S. Pat. No. 6,669,467, (which is incorporated herein by reference). Sometimes a venturi will crack, but the crack will not be noticeable. This can lead to incomplete combustion, contamination of the environment and can also be a safety hazard for workers at the site where the venturi body and heater/burner is being used.

SUMMARY OF THE INVENTION

It is an object of the present invention to provide an inspirator that is used with a burner to power an infrared heater.

An inspirator for use with an infrared burner comprises a fuel inlet and air inlet to a venturi. The inspirator has a successively larger stepped bore downstream of the venturi.

An inspirator for use with an infrared heater comprises an elongated bore having an inlet and an outlet. The inlet smoothly tapers to a venturi with a successively larger stepped bore downstream of the venturi to the outlet. The inspirator has a fuel inlet and an air inlet to the venturi, the air slash/fuel mixture at the outlet being combustible.

A method of manufacturing a venturi body of an inspirator, the venturi body having a bore that is formed from a solid block of metal, forming the bore using a CNC lathe to taper the bore from an inlet to a venturi and forming a plurality of successively larger step sections downstream of the venturi to the outlet.

BRIEF DESCRIPTION OF THE DRAWINGS

FIG. 1 is a perspective view of an inspirator;
FIG. 2 is a perspective view of a venturi body;
FIG. 3 is top view of the venturi body with an interior of the body shown with dotted lines;
FIG. 4 is a side view of the venturi body of FIG. 3 with an interior of the venturi body shown with dotted lines;
FIG. 5 is an and view of the venturi body shown in FIG. 4;
FIG. 6 is a perspective view of a venturi collar;
FIG. 7 is a side view of the collar;
FIG. 8 is a perspective view of a venturi plate;
FIG. 9 is a side view of the venturi plate.

DETAILED DESCRIPTION OF A PREFERRED EMBODIMENT

Figures 10, 11:
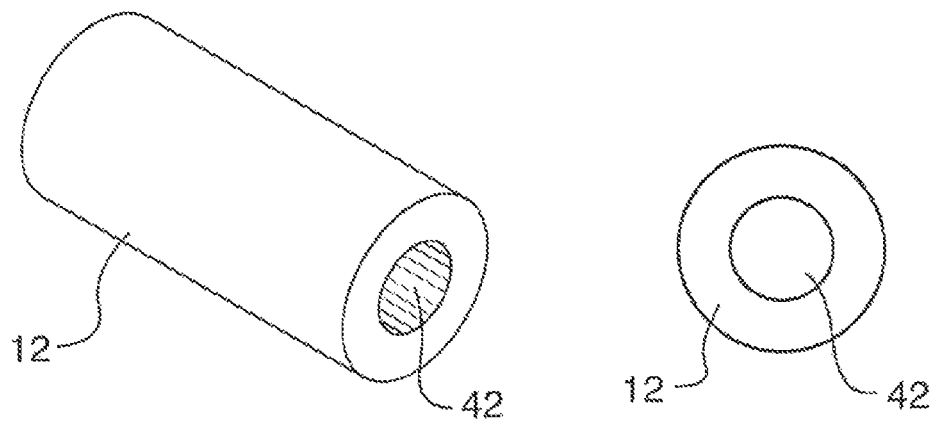
FIG. 10 is a perspective view of a venturi spacer.
FIG. 11 is an end view of the venturi spacer.

In FIG. 1, en inspirator tube has a fuel inlet 4 located in a plate 8. An air inlet 6 is located downstream of the plate 8. The plate 8 is connected by bolts (not shown) and openings 10 that extend through spacers 12 and into threaded openings in a collar 14. The collar 14 has an annular shape with an annulus that is sized to fit over an upstream end 16 of a venturi body 18. The air inlet 6 is located to provide en air passage to a venturi (not shown in FIG. 1). The fuel inlet 4 in the plate 8 extends through a tube 18 into a cover 20 on the inlet end 16 of the venturi body 18. The venturi body 18 has a downstream end 22.

In FIG. 2, there is shown a perspective view of the venturi body 18 with dotted lines to expose an interior of the venturi body 18. Preferably, there are two air inlets 6, one each side of the venturi 26. The venturi body 18 has a bore 24 extending from the upstream end 16 to the downstream end 22. From FIGS. 2, 3 and 4, the shape of the bore 24 can readily be seen. From the upstream end 16, the bore 24 smoothly converges to a venturi 26, which is the narrowest area of the bore 24. Downstream from the venturi 26, the bore has successively larger stepped sections 28, 30, 32, 34, with each successive section having a larger diameter than the immediately adjacent upstream section. In some venturi bodies, if the air inlets 6 are too large (i.e. allow much air into the venturi), partial plugs (not shown) can be inserted to reduce their size so that an appropriate volume of air enters the venturi body to properly mix with a fuel being supplied through the fuel inlet 4 to produce infrared heat as required. The fuel entering the fuel inlet 4 is mixed with air entering the air inlets 6 to produce a combustible air/fuel mixture at the downstream end 22. FIGS. 3 and 4 show dimensional lines that should be deleted.

In FIG. 5, there is shown an end view of the venturi body 2 and bore 24. The bore has a circular cross-section. FIG. 5 shows imaginary lines 35 that intersect at a longitudinal center axis of the inspirator 2.

In FIGS. 6 and 7, there is shown the collar 14 which has an annular shape and has an annulus 36 and two openings 38 to receive bolts (not shown) from the plate 8 and spacers 12 (not shown) in FIGS. 6 and 7. The annulus 36 of the collar 14 is sized to fit over the upstream end 16 of the venturi body 18. From FIGS. 2, 3 and 4, can be seen at the upstream end 16 is slightly reduced in size compare to the size of the venturi body immediately adjacent to the upstream end. The collar is mounted in the location of reduced size and is held in place on the upstream end of the venturi body by welding.

In FIGS. 8 and 9, the plate 8 has a central opening 4, being the fuel inlet 4, and two openings 10 to receive bolts (not shown) that hold the plate 8, spacers 12 and collar 14 together (see FIG. 1).

FIGS. 10 and 11 show a spacer 12 having a longitudinal opening 42 therein that is sized to receive the bolts (not shown) that extend through the plate 8, through two spacers 12 and into the cellar 14 as shown in FIG. 1.

Figure 12:
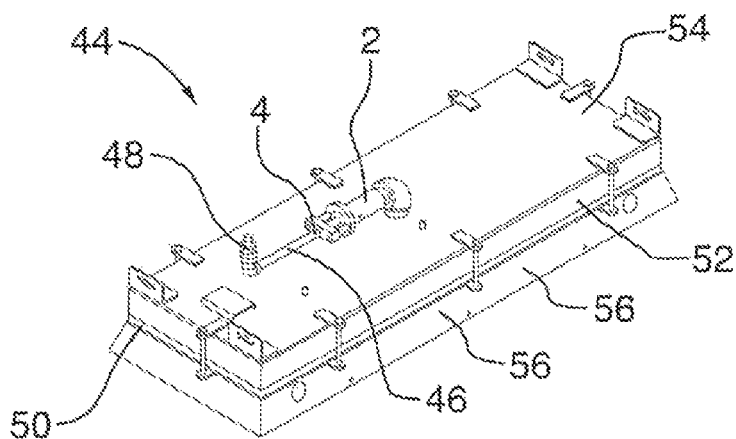
FIG. 12 is a perspective view of the inspirator connected to an infrared heater.
Figure 13:
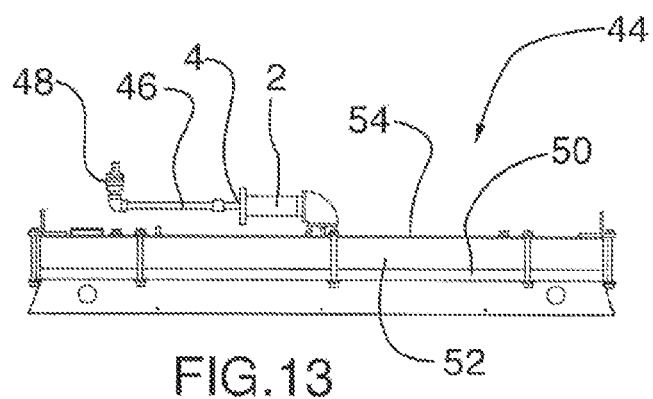
FIG. 13 is a front view of the infrared heater.

In FIGS. 12 and 13, the inspirator 2 is mounted on an infrared heater 44. A fuel supply line 46 is connected to the fuel inlet 4 and has a first connector 48 that is shaped to receive a second connector (not shown) from an additional supply line (not shown). The heater 44 has a cartridge 50 that, together with a housing 54, defines a chamber 52. A skirt 56 protects the cartridge 50 from physical damage and maintains a minimum distance between the cartridge 50 and a surface (not shown) to be heated. The cartridge is preferably supported by a screen (not shown) located at a top of the skirt. Combustion occurs outside of a lower surface of the cartridge 50 between the cartridge 50 and a supporting surface (not shown).

Preferably, the inspirator is made from mild steel and is not cast. The inspirator is fabricated from a solid block of metal using a CNC lathe (or other suitable equipment) to cut the bore in the shape shown. The air inlets are preferably created by drilling through the wall of the venturi. Depending on the size of the inspirator and the flow-rate and volume of fuel being supplied, the air inlets can be partially plugged to reduce the amount of air being supplied.

Preferably, she venturi body described is powered by liquid propane under pressure that is regulated and passed through a vaporizor (not shown) to power an infrared heater that is used for repairing or installing asphalt roadways, parking lots, walkways, boulevards, etc. The infrared heater is designed for use outdoors in circumstances in which the inspirator and heater are subjected to abrupt termination of movement, or changes in direction, collisions with the surface being treated and with other objects and other rough treatment. Since the inspirator is made of metal, and preferably of mild steel, it can withstand a significant level of rough treatment without being damaged.

Preferably, the fuel is liquid propane under pressure in a propane tank (not shown). Liquid propane is drawn by a pump (not shown) through a fuel supply line (not shown) to a vaporizor (not shown). The propane gas from the output of the vaporizor passes through a control regulator not shown). The propane gas continues through the supply line 46 to the fuel inlet 4. The gas pressure passing through the venturi entrains air at the proper air/gas ratio for complete combustion. The foregoing description of the supply of liquid propane under pressure is known and is described in detail in U.S. Pat. No. 6,669,467. While propane is the preferred fuel, other liquid hydrocarbon fuels that can be readily vaporized will be suitable. For example, butane, pentane, ethane, methane, or combinations with other fuels will be suitable.

It is believed that the steps downstream of the venturi, increase turbulence within the venturi tube and improve the degree of mixing between the fuel end the air. Variations within the scope of the attached claims will be readily apparent to those skilled in the art.

We claim:

1. An inspirator for use with an infrared heater, the inspirator comprising an elongated bore having an inlet and an outlet, the inlet smoothly tapering to a venturi, the elongated bore having at least three successively larger steps downstream of the venturi to the outlet, the inspirator having a fuel inlet and at least one air inlet to the venturi, en air/fuel mixture at the outlet being combustible, the at least one air inlet being substantially perpendicular to a longitudinal center axis of the elongated bore, the at least one air inlet having a line axis that intersects the longitudinal center axis of the elongated bore.

2. The inspirator as claimed in claim 1 wherein the elongated bore has four successively longer steps from the venturi to the outlet.

3. The inspirator as claimed in claim 1 wherein the inspirator is formed from a solid block of metal.

4. The inspirator as claimed in claim 3 wherein the block of metal is made from mild steel.

5. The inspirator as claimed in claim 1 wherein there is a second air inlet to the venturi.

6. The inspirator as claimed in claim 4 wherein the second air inlet second to the venturi is substantially perpendicular to the elongated bore.

7. The inspirator as claimed in claim 1 wherein the fuel inlet is upstream of the inlet to the elongated bore.

8. The inspirator as claimed in claim 1 wherein the elongated bore has a circular cross section.

9. A method of manufacturing of a venture body of an inspirator, the method comprising forming a venturi body with an elongated bore that is formed from a solid block of metal, using a lathe to smoothly taper the elongated bore from an inlet to the venturi, forming a plurality of at least three successively larger step sections downstream of the venturi to the outlet and forming at least one air inlet to the venturi that is substantially perpendicular to a longitudinal center axis of said elongated bore, locating the at least one air inlet with a line axis that intersects the longitudinal center axis of the elongated bore.

10. The method as claimed in claim 9 including the step of forming a fourth successively larger step in said elongated bore downstream of the venturi.

11. The method as claimed in claim 9 including the step of forming a second air net to the venturi that is substantially perpendicular to the longitudinal center axis of said elongated bore, there being two air inlets.

12. The method as claimed in claim 9 including the step of fabricating the venturi body from mild steel.

13. The method as claimed in claim 9 including the step of using a CNC lathe to taper the bore.

14. The method as claimed in claim 11, including the step of forming said two air inlets to each have a line axis that intersects said longitudinal center axis of said elongated bore.

15. The method as claimed in claim 11 wherein the air net is a first air net including the step of forming the second air inlet to be located substantially 180° apart from said first air inlet.

16. The inspirator as claimed in claim 6 wherein the second air net has a second line axis that intersects said longitudinal center axis of said elongated bore.

17. The inspirator as claimed in claim 6 wherein the at least one air inlet is the first air inlet and the second air inlet is located substantially 180° apart from said first air inlet.

* * * * *